(12) United States Patent
Weber (10) Patent No.: US 11,482,823 B2
(45) Date of Patent: Oct. 25, 2022

(54) GROMMET STATION

(71) Applicant: Komax Holding AG, Dierikon (CH)

(72) Inventor: Bruno Weber, Ballwil (CH)

(73) Assignee: KOMAX HOLDING AG, Dierikon (CH)

( * ) Notice: Subject to any disclaimer, the term of this patent is extended or adjusted under 35 U.S.C. 154(b) by 336 days.

(21) Appl. No.: 16/662,082

(22) Filed: Oct. 24, 2019

(65) Prior Publication Data

US 2020/0144779 A1    May 7, 2020

(30) Foreign Application Priority Data

Nov. 6, 2018 (EP) .................................... 18204666

(51) Int. Cl.
*B23P 19/00* (2006.01)
*H01R 43/00* (2006.01)
*H01R 13/52* (2006.01)
*H01R 43/28* (2006.01)

(52) U.S. Cl.
CPC ....... *H01R 43/005* (2013.01); *H01R 13/5205* (2013.01); *H01R 43/28* (2013.01); *Y10T 29/5327* (2015.01)

(58) Field of Classification Search
CPC .............. H01R 13/5205; H01R 43/052; H02G 15/192; Y10T 403/535; Y10T 29/53239; Y10T 29/5327
USPC ......... 29/761, 235, 450, 743, 754, 787, 789, 29/795
See application file for complete search history.

(56) References Cited

U.S. PATENT DOCUMENTS

| 5,016,346 A | * | 5/1991 | Gerst ................... H01R 43/005 29/754 |
| 2001/0039707 A1 | | 11/2001 | Masuda et al. |
| 2002/0133945 A1 | | 9/2002 | Nomoto |

FOREIGN PATENT DOCUMENTS

| DE | 69020059 T2 | 9/1995 |
| EP | 0410416 A2 | 1/1991 |
| EP | 0534106 A1 | 3/1993 |
| EP | 0626738 A1 | 11/1994 |
| EP | 1689049 B1 | 8/2006 |
| EP | 1912296 A1 | 4/2008 |

* cited by examiner

*Primary Examiner* — Thiem D Phan
(74) *Attorney, Agent, or Firm* — William J. Clemens; Shumaker, Loop & Kendrick, LLP (57) ABSTRACT

A grommet station includes a grommet assembly module that provides a cable end with a grommet. The assembly module has an assembly unit with an expansion sleeve for holding the grommet in an expanded state and placing the grommet on the cable end, a transfer unit with a mandrel, and a grommet-receiving device for receiving and holding the grommet during the assembly operation. In an acquisition position of the transfer unit, a grommet can be pushed onto the mandrel and, in a delivery position, the mandrel is in an operative connection with the assembly unit such that the grommet can be transferred from the mandrel to the assembly unit with the expansion sleeve temporarily encompassing the mandrel in the delivery position. The mandrel and the expansion sleeve are oriented in the same direction, and the assembly unit is a modular unit with a grommet-receiving device and a downstream expansion sleeve.

13 Claims, 5 Drawing Sheets

GROMMET STATION

FIELD

The invention relates to a grommet station for assembling electrical cables. With such grommet stations, grommets, which are required for example for moisture-tight feed-throughs of electrical cables through connector housings or housing walls of electrical appliances, can be applied to cables in an economical manner.

BACKGROUND

In the production of cables, cable may be cut to length and stripped, provided with grommets, crimped, and optionally provided with housings. For this purpose, a stripped cable is provided with a grommet, and then usually a metal contact is crimped. This crimp contact is designed so that it fastens the grommet on the cable. Automated or semiautomatic machines are frequently used for the assembly of cables whereby, in a semiautomatic machine, the cable is manually fed to the respective processing station.

Figure 3:
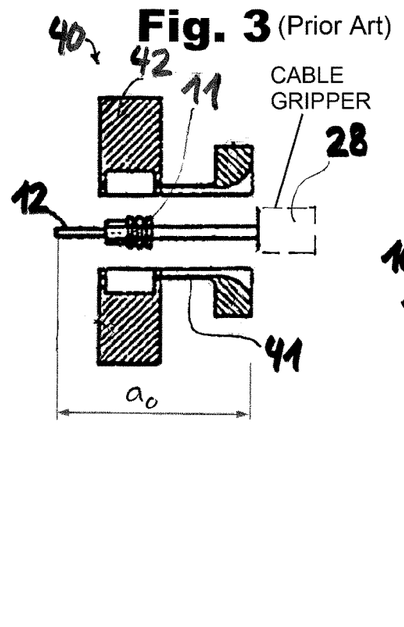
FIG. 3 shows a longitudinal section through an assembly unit of a grommet assembly module according to the prior art.

A comparable grommet station of this type is shown in EP 0 626 738 A1. The grommet station includes a grommet storage means comprising a drum filled with grommets and a grommet assembly module for providing a stripped cable end of a cable with a grommet. By means of a conveyor rail, the grommets are transported in the correct position to a separating unit, from which grommets are individually pushed onto a mandrel of a transfer unit. The transfer unit is designed as a turning device and comprises a total of four mandrels. In addition to the referenced transfer unit with the four mandrels, the grommet assembly module further comprises a placement head with an expansion sleeve. This placement head is shown in FIG. 3 of the drawings in the present application and denoted with the number 40 there. At the end of the separating unit, an ejection device is arranged with a tappet which can be moved up and down, with the tappet in each case feeding the first grommet in the conveyor rail to the transfer device. The transfer device is successively pivotable around a 90° angle wherein, in a first position, the grommet is pushed onto the mandrel by means of said tappet. After a rotation around 90°, the grommet is pushed in a second position of the transfer unit for the purpose of expansion onto an area of the mandrel with a larger diameter. The actual placement of the grommet onto the cable end takes place in a third position. In this third position of the transfer device, the grommet is removed from the mandrel using the placement head 40 shown in FIG. 3 with a grommet receiving part 42 and expansion sleeve 41, and the grommet 11 in the expanded state is placed on the cable 12 and finally pushed thereon. Once the mandrel has been pivoted to the third position, the placement head 40 encloses the grommet with the two-part expansion sleeve 41 and a grommet receiving part 42, which is formed by two parts as well. By means of the grommet receiving part 42, the grommet 11 is pushed onto the expansion sleeve 41. The expansion sleeve 41, which is arranged upstream from the grommet receiving part 42, has a widened area at the front end facing the cable 12 with a funnel-shaped insertion opening for the insertion of the cable into the closed placement head 40. In practice, it has been found that this grommet assembly station requires a relatively large cable projection. This cable projection is the exposed part of the cable end and identified in FIG. 3 with $a_o$. In fully automated grommet stations, for example, the cable must protrude on a cable gripper 28 that brings the cable to the placement head by this cable projection and may sag accordingly. When feeding the cable with the gripper, undesired vibrations and motions may occur, and the handling of particularly thin cables may be difficult. Furthermore, the processing of sheathed cables, in which several individual cables are combined into one cable, may be difficult.

It is therefore an object of the present invention to avoid the known disadvantages and in particular to provide a grommet station with which cables may be provided with grommets in a reliable and efficient manner.

SUMMARY

This object is achieved according to the invention with a grommet station designed to equip electrical cables with grommets comprised of a grommet assembly module for providing a preferably stripped cable end of a cable with a grommet. In addition to the grommet assembly module, the grommet station may have a grommet storage means comprising a drum for the loose storage of grommets and a conveyor rail guiding the correctly positioned grommets to the grommet assembly module. The grommet assembly module comprises an assembly unit having an expansion sleeve for holding the grommet in the expanded state and for placing the grommet onto the cable end and a transfer unit having at least one mandrel. The transfer unit is designed so that, in a transfer position, a grommet is pushed onto the mandrel and so that, in a delivery position of the mandrel, the grommet engages in an operative connection with the assembly unit, that the grommet can be transferred from the mandrel to the placement unit wherein, in the delivery position, the expansion sleeve of the assembly unit temporarily encompasses the mandrel. By means of an ejection device, the grommet can be pushed from the conveyor rail onto the mandrel in the acquisition position. The ejection device may include a plunger that can be moved up and down, with which the first grommet in the conveying rail can be fed into the transfer device. The mandrel and the expansion sleeve encompassing the mandrel have a rectified orientation in the delivery position whereby the grommet can be grasped by the expansion sleeve from behind.

The term rectified orientation means that the two tips of the respective components, i.e., the tip of the mandrel on the one hand and the tip of the expansion sleeve on the other hand, point in the same direction. When the expansion sleeve encompasses the mandrel in the delivery position, the referenced tips are facing the cable end of the cable. Due to the fact that the grommet can be grasped by the expansion sleeve from behind, the cable may be reliably and efficiently provided with a grommet. The special arrangement also makes it possible for the grommet assembly module to have a compact design. One particular advantage of the arrangement is that the required cable projection may be significantly reduced. The now less sagging or barely sagging cable end makes the cable much easier to handle. A cable gripper can hold and provide the cable end so that it can be processed by the assembly unit and the cable end can be advanced toward the assembly unit by means of the cable gripper, for example of a fully automated machine, or manually as well if necessary.

The assembly unit has a longitudinal central axis along which the expansion sleeve extends. The cable preferably has, at least in the area of the cable end, a cable axis which is coaxial with the longitudinal center axis. Likewise, the mandrel extends in the delivery position coaxially with the longitudinal central axis. Unless stated otherwise, the directional data used in connection with the assembly unit refer to this longitudinal central axis. Thus, if terms such as "radial" or "axial" are used in this context, they are based on the longitudinal center axis.

Preferably, the expansion sleeve is formed in two parts. The two-part expansion sleeve has two radially counter-rotating shell parts. The shell parts, which can be moved from a closed position to an open position and vice versa by means of one or more actuators, wherein the shell parts are assembled in the closed position to form the sleeve shape and are spaced apart, preferably parallel, from each other in the open position, allow for an efficient operation of the grommet station. A shared electric motor may be used for example as an actuator for a simultaneous motion of the shell parts. Such an expansion sleeve may easily be placed on the mandrel by means of a closing motion, when the transfer unit is in the delivery position, and encompass the same. After the expansion sleeve has been opened, the operative connection between the assembly unit and the transfer unit can be released again, at least temporarily, so that the transfer unit can be moved back into the acquisition position.

Preferably, the assembly unit furthermore comprises a grommet-receiving device for receiving and holding the grommet during the assembly process. Particularly preferably, the expansion sleeve and the grommet-receiving device are mechanically coupled to each other wherein the expansion sleeve can be inserted into the grommet-receiving device. For the mechanical coupling, the expansion sleeve and the grommet-receiving device may be displaced relative to each other in the axial direction. This ensures that the grommet is pushed onto the expansion sleeve when the expansion sleeve is inserted into the grommet-receiving device.

So that the expansion sleeve can easily grasp the grommet from behind, a modular unit comprising the expansion sleeve and grommet-receiving device in which the expansion sleeve is located downstream from the grommet-receiving device may be advantageous. The assembly unit has a front side which is adjacent to the cable to be processed and faces the cable. The cable is therefore located in front of the assembly unit. In this context, downstream means that the expansion sleeve is arranged behind the grommet-receiving device or at the back (i.e., opposite from the front) of the grommet-receiving device.

Furthermore, it may be advantageous if the grommet-receiving device has a funnel-shaped insertion section via which the cable end can be inserted into the grommet-receiving device.

The grommet-receiving device may, just as the expansion sleeve, be formed in two parts. The two-piece grommet-receiving device may have two jaws which are each movable in pairs together with the respective shell parts of the expansion sleeve between a closed position and an open position. The previously mentioned funnel-shaped insertion section is formed by the jaws when the jaws are in the closed position. In particular, due to associating the funnel-shaped insertion section with the grommet-receiving device, it is possible to create a compact assembly unit which makes it possible to make do with a small cable projection.

The grommet-receiving device may comprise stripping means, by way of which the grommet may be stripped off the expansion sleeve at the end of the grommet assembly process.

If the grommet-receiving device has a receiving channel for receiving the mandrel with the grommet and/or the cable end, it may be advantageous for the integration of the stripping means into the receiving device if a collar made from stripping means is arranged preferably at the rear end of a grommet-receiving section of the receiving channel which, in order to strip the grommet, forms a stop for the grommet when the expansion sleeve is reversed out of the grommet-receiving device. The grommet-receiving section is that section of the receiving channel which is provided for receiving the grommet.

Further pushing means may be provided, by way of which the grommet, which is already pushed onto the mandrel, can be pushed to a section of the mandrel with a larger diameter for expanding the grommet. Such pushing means could be formed by a separate pushing device similar to the one in EP 0 626 738 A1 mentioned above. With regard to a compact design and an efficient mode of operation of the grommet station, however, it is advantageous if the pushing means are integrated in the grommet-receiving device. The pushing means can also serve to push the grommet from the mandrel onto the expansion sleeve when retracting the expansion sleeve in the grommet-receiving device.

Particularly preferably, the aforementioned pushing means may contain pushing elements which are resiliently mounted in the jaws in the transverse direction, that is transverse and preferably perpendicular to a longitudinal central axis of the assembly unit corresponding to the cable axis, and which are slidable to a limited extent. The pushing elements may be preferably plate-like in this regard.

Further, it may be advantageous if the transfer unit comprises a mandrel carrier in which the at least one mandrel is slidably mounted in the axial direction between a rest position and an extended position, and the mandrel is movable in the delivery position from the rest position to the extended position by means of an actuator.

The at least one mandrel may be held in the rest position by means of a spring element which generates a preloading force. Due to the spring element, for example in the form of a helical compression spring, the mandrel is automatically returnable from the extended position to the rest position after the deactivation of the actuator.

The grommet assembly module may have a traversing device operable by means of the actuator through which the at least one mandrel is movable into the extended position.

It is particularly advantageous if exactly one mandrel is associated with the transfer unit. A mandrel may therefore be slidably mounted in the axial direction in the mandrel carrier. In this case, it may be advantageous for the mandrel to pass through the mandrel carrier and to project from it on both sides wherein a portion of the mandrel which projects from the mandrel carrier on the front side serves for pushing the grommet and a back side of the mandrel forms a bolt which may be acted upon by a linearly movable pusher. At the end of the bolt, a docking element may be provided for this purpose which engages in the delivery position in a complementary receiver of the pusher, thus making the displacement motion to the extended position of the mandrel possible. Moving devices other than pushers are conceivable as well. The mandrel could, for example, be moved via a motor-driven gear and a rack and pinion gear.

The grommet station may be operated efficiently if the transfer unit is designed as a pivot unit. In this case, the pivot unit preferably has a pivoting range of 90° between the acquisition position and delivery position. The transfer unit is particularly preferably designed such that the mandrel is movable back and forth between the acquisition position and the delivery position by means of a 90° rotation.

In the acquisition position, the mandrel may have a vertical direction, and a grommet may be pushed onto the mandrel from above a grommet, for example by means of the aforementioned ejection device. In the delivery position, the mandrel may extend in a horizontal direction.

DESCRIPTION OF THE DRAWINGS

Further individual features and advantages of the invention follow from the description of exemplary embodiments below and from the drawings. The drawings show the following.

DETAILED DESCRIPTION

Figure 1:
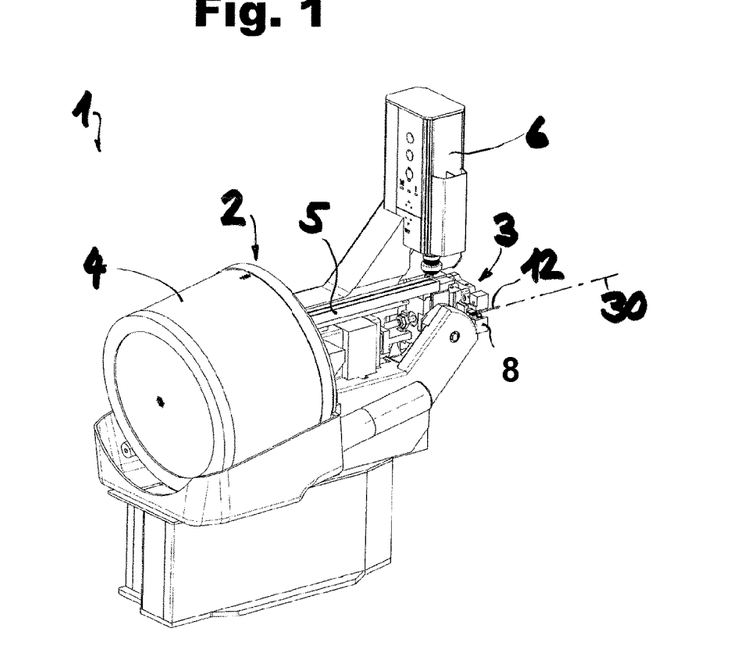
FIG. 1 is a perspective view of an overall view of a grommet station according to the invention.

FIG. 1 shows a grommet station identified with the number 1 for providing electrical cables 12 with grommets. Grommets are tubular or tube-like sealing elements, for example made of silicone, a rubber material, or other flexible plastic material, which are usually required for moisture-tight feedthroughs of electrical cables through connector housings or housing walls of electrical appliances.

The grommet station 1 includes a grommet storage means 2 and a grommet assembly module 3 for providing a stripped cable end of a cable 12 with a grommet. The grommet assembly module 3 comprises an assembly unit 8 that extends along a longitudinal central axis 30 with which a grommet can be fitted onto the cable 12, which is also positioned along the longitudinal central axis 30. Such a grommet station 1 may be used by itself or as part of a system for assembling cables which, besides the grommet station, may comprise further stripping stations, crimping stations, and, if appropriate, housing mounting stations.

The cable 12 is brought to the grommet assembly module 3 with a gripper (not shown). Such a grommet station 1 is fully automated. Of course, it would also be conceivable to integrate the novel grommet assembly module 3 described below in detail not into a fully automated model, but into a semiautomatic model or into other models.

The grommet storage means 2 of the grommet station 1 comprises a drum 4 for the loose storage of a plurality of grommets, a conveyor rail 5 projecting into the rotating drum 4 for the correct storage and transport of the grommets, and a separating unit 6 with an ejection device by means of which each of the first grommet in the conveyor rail 5 is supplied to the grommet assembly module 3. Concerning the grommet storage means 2, the grommet station 1 shown in FIG. 1 essentially corresponds to the grommet stations disclosed in EP 0 626 738 A1 or EP 0 534 106 A1. Details of the configuration of the grommet storage means 2 comprising a drum 4, a conveyor rail 5, and a separation unit 6 can be obtained from these documents. However, the grommet assembly module 3 described in detail below could also be combined with other grommet storages or grommet supply devices. Even a grommet station without a grommet storage means would be conceivable in which individual grommets are manually fed into the grommet assembly module 3.

Figure 2:
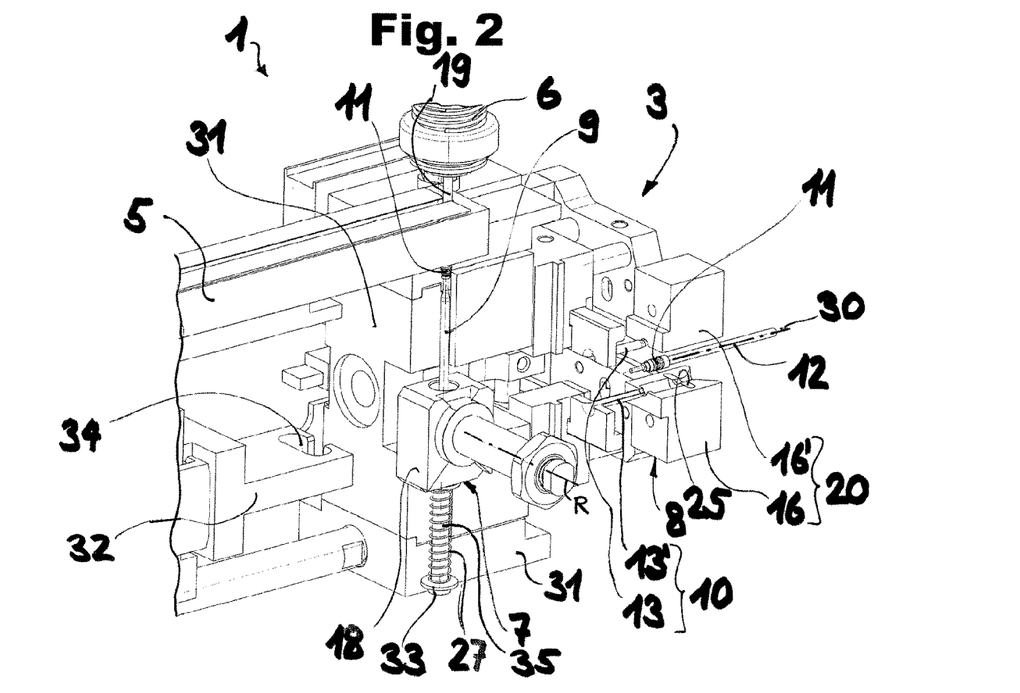
FIG. 2 shows a grommet assembly module of a grommet station (detail view of FIG. 1)

Design details of the grommet assembly module 3 of the grommet station 1 can be obtained from FIG. 2. For an improved view of the relevant components, some components, such as the covers of the machine frame 31, were removed in comparison to FIG. 1. The grommet assembly module 3 comprises a transfer unit 7 with a mandrel 9. The transfer unit 7 is designed as a pivot unit and may be pivoted back and forth between the acquisition position shown in FIG. 2 and a second horizontal position in which the mandrel 9 faces the cable end of the cable 12. The corresponding axis of rotation for the pivoting motion is identified with the letter R. The grommet 11 is applied onto the cable 12 by means of the assembly unit 8. Since the mandrel 9 of the assembly unit moves the grommet 11 into the aforementioned second position, this position is referred to as the delivery position.

The transfer unit 7 comprises a mandrel carrier 18 which is connected to the machine frame 31 by means of a pivoting mechanism with a motor-operated pivoting mechanism. In the acquisition position in which the mandrel 9 is vertically aligned, a grommet 11 can be applied to the mandrel 9 by means of the separation unit 6. This is done by means of a plunger of an ejection device 19 of the separation unit 6 which can be moved vertically up and down. Similar to the mandrels already known from EP 0 626 738 A1, the mandrel 9 has two receiving areas for the grommet. A front area has a smaller diameter; a rear area has a larger diameter. In the acquisition position, the grommet is first pushed onto the front area of the mandrel 9 with the smaller diameter by means of the separation unit 6.

The mandrel 9 is accommodated in the mandrel carrier 18 in the movably positioned axial direction and may be moved in the axial direction from a rest position to an extended position by means of an actuator. The mandrel 9 is in the rest position in the vertical acquisition position of the transfer unit 7. The mandrel 9 is held in the rest position by means of a helical compression spring 27 for generating a preloading force. The mandrel 9 passes through the mandrel carrier 18 and projects from the mandrel carrier 18 on both sides, wherein a portion of the mandrel which projects from the mandrel carrier 18 at the front comprises the tip of the mandrel and serves to handle the grommet, and wherein an area of the mandrel which is rearward with respect to the mandrel carrier 18 forms a bolt 35 which is acted upon by a linearly movable pusher 32. A docking element 33 is provided at the end of the bolt 35, along which the spring 27 is guided, said docking element, when the transfer unit 7 is pivoted into the horizontal delivery position, engaging in a complementary receiver 34 on the pusher 32. After this engagement, the displacement motion into the extended position of the mandrel 9 is possible.

The assembly unit 8 essentially consists of an expansion sleeve 10 extending along the longitudinal central axis 30 for holding the grommet 11 in the expanded state and for placing the grommet 11 onto the cable end of the cable 12 and a grommet-receiving device 20 for receiving and holding the grommet 11 during the assembly operation. The expansion sleeve 10 is obviously formed in two parts and comprises two shell parts 13, 13'. The grommet-receiving device 20 is also formed in two parts and has two jaws 16, 16'. The opposing radially movable jaws 16, 16' and the shell parts 13, 13' may be moved in pairs between a closed position and an open position. In the open position shown in FIG. 2, the respective jaws 16, 16' and shell parts 13, 13' are in a parallel position spaced apart such that the intermediate cable end of the cable 12 that is already provided with a grommet 11 is exposed and can be removed from the grommet station 1 for further processing. The cable axis of the cable 12 corresponds to the longitudinal central axis 30 predetermined by the assembly unit 8. The expansion sleeve 10 and the grommet-receiving device 20 are mechanically coupled with each other. They are configured to be displaceable relative to each other in the axial direction along the longitudinal center axis 30 wherein the expansion sleeve 10 is inserted into the grommet-receiving device 20, which causes the sleeve to be pushed onto the expansion sleeve 10 when the expansion sleeve 10 is inserted into the grommet-receiving device 20.

The grommet-receiving device 20 has pushing means for further pushing the grommet 11 that was already placed onto the mandrel 9 onto an extended section of the mandrel 9 with a larger diameter for widening the grommet. The aforementioned pushing means comprise the pushing elements 25, 25' that are movable perpendicular to the longitudinal central axis 30 in the jaws 16, 16' (cf., in particular, FIG. 14 below).

Figure 4:
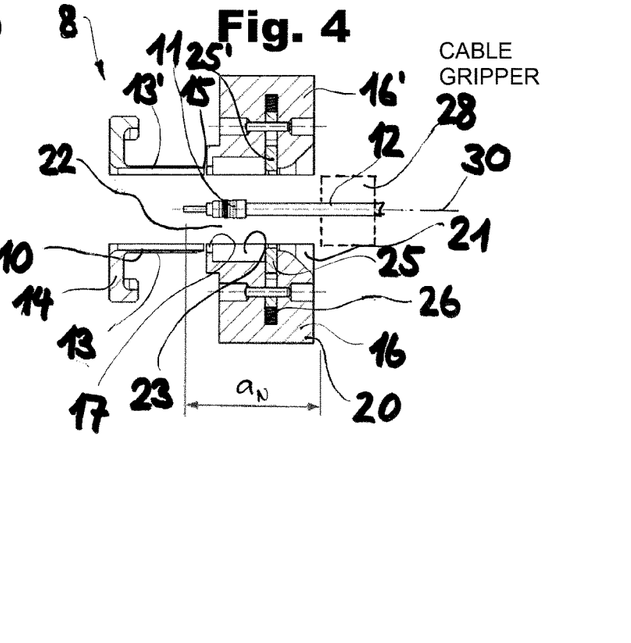
FIG. 4 shows a longitudinal section through an assembly unit of the grommet assembly module according to FIG. 2.

Further details on the configuration of the assembly unit 8 of the grommet assembly module 3 of the grommet station 1 are shown in FIG. 4. The assembly unit 8 is a modular unit with a grommet-receiving device 20 and a downstream expansion sleeve 10. The assembly unit 8 has a front side formed by the grommet-receiving device 20, which faces the cable 12. At this front side, a funnel-shaped insertion portion 21 is arranged, through which the cable end of the cable 12 can be inserted into the closed grommet-receiving device 20 (cf. FIG. 11 below). In other words, the axially mounted expansion sleeve 10 is positioned or arranged behind the grommet-receiving device 20 with respect to the longitudinal central axis 30.

The expansion sleeve 10 includes an elongated section that is cylindrical in the closed position with a sleeve tip 15 onto which the grommet 11 can be pushed and a flange section 14 that adjoins this section. The sleeve tip 15 points forward; the flange section 14 forms the rear end of the expansion sleeve 10. The mandrel 9 (not shown) has a mandrel tip that points forward, or toward the front side, in the delivery position. The mandrel 9 and the expansion sleeve 10 that temporarily encompasses the mandrel in the delivery position are thus oriented in the same direction. Due to the special arrangement, the orientation and positioning of the mandrel 9 and the expansion sleeve 10 are ensured in an advantageous manner in that the expansion sleeve 10 can grasp the grommet 11 from the rear.

FIG. 4 also shows an open receiving channel 22 of the grommet-receiving device 20 for receiving the mandrel 9 where the grommet 11 and the cable end are still recognizable. The receiving channel 22 has a sleeve adapted to the grommet-receiving section 23 for receiving the grommet 11. The front end of the receiving channel 22 is widened and forms a funnel-shaped insertion portion 21 via which the cable end can be inserted into the grommet-receiving device 20 when the grommet-receiving device 20 is closed (cf. FIG. 11). A collar 17 is arranged at the rear end of the grommet-receiving device 20 which forms a stop for the grommet 11 so as to strip the grommet when the expansion sleeve 10 is retracted from the grommet-receiving device 20 (cf. FIG. 12). FIGS. 3 to 13 below show the operating mode of the grommet assembly module 3 and the individual process steps for the grommet assembly with the novel grommet station 1.

FIGS. 3 and 4 compare and contrast the assembly units or heads of known grommet stations with the grommet station according to the invention. FIG. 3 shows a prior art assembly head 40 from the aforementioned EP 0 626 738 A1. FIG. 4 shows the assembly unit 8 of the grommet station 1 according to the exemplary embodiment of FIGS. 1 and 2. The respective cable projections are identified with $a_N$ (FIG. 4) and $a_o$ (FIG. 3). The cable projection $a_N$ in the novel grommet station 1 is obviously much shorter than the cable projection $a_o$ in the known grommet station. The cable gripper with which the cable is brought to the grommet station is suggested in the figures and identified there with the number 28.

Figure 5:
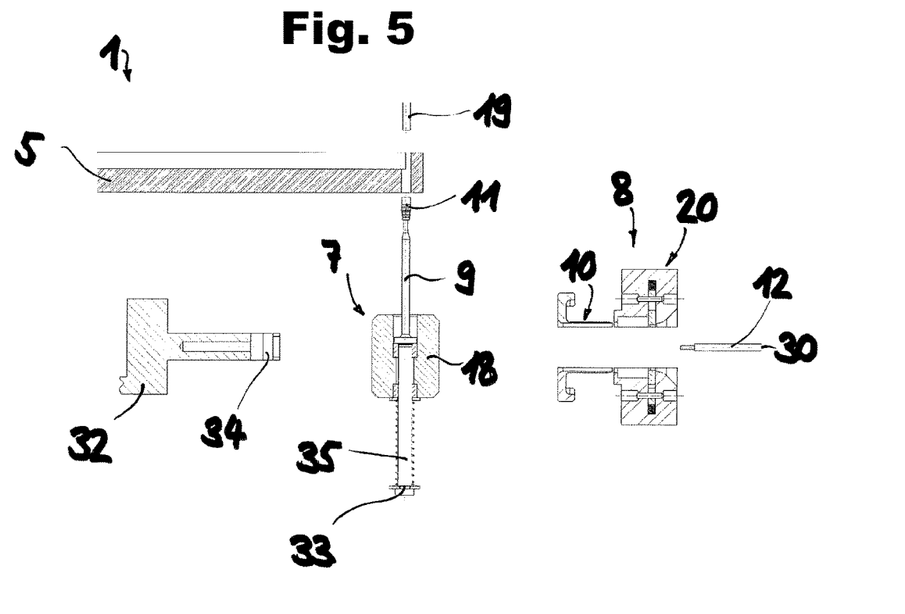
FIG. 5 shows a section through a grommet assembly module at the beginning of an assembly process.
Figure 6:
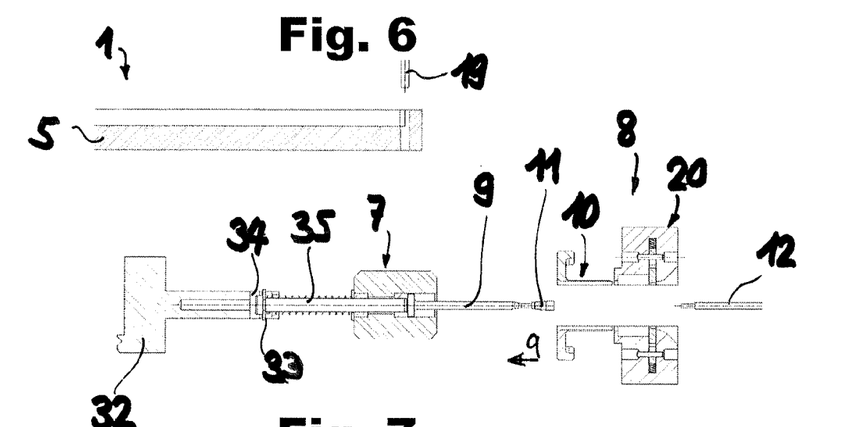
FIG. 6 shows the grommet assembly module from FIG. 5, but after the mandrel of a transfer unit has been pivoted into a delivery position.
Figure 7:
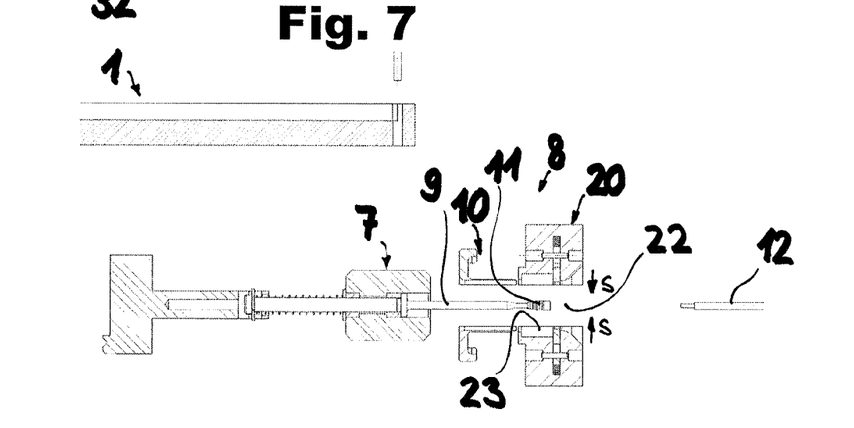
FIG. 7 shows the grommet assembly module with the open assembly unit driven to the transfer unit.
Figure 8:
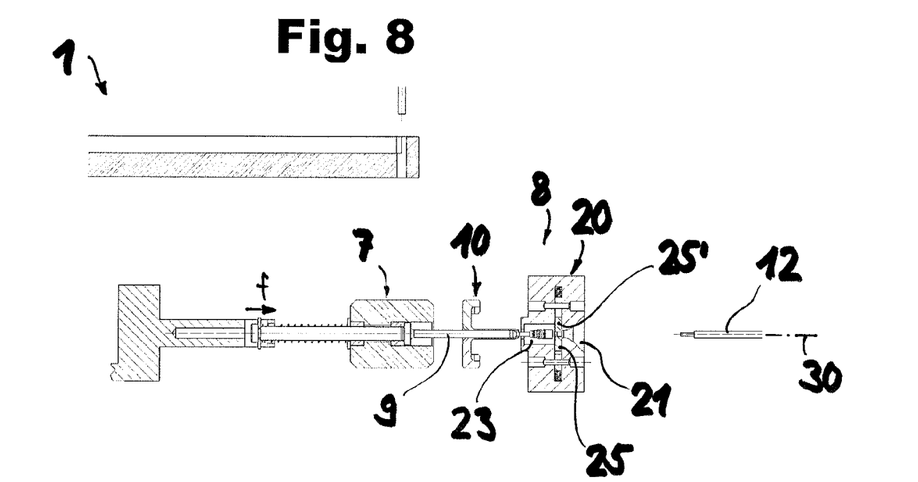
FIG. 8 shows the grommet assembly module with the now closed assembly unit.
Figure 9:
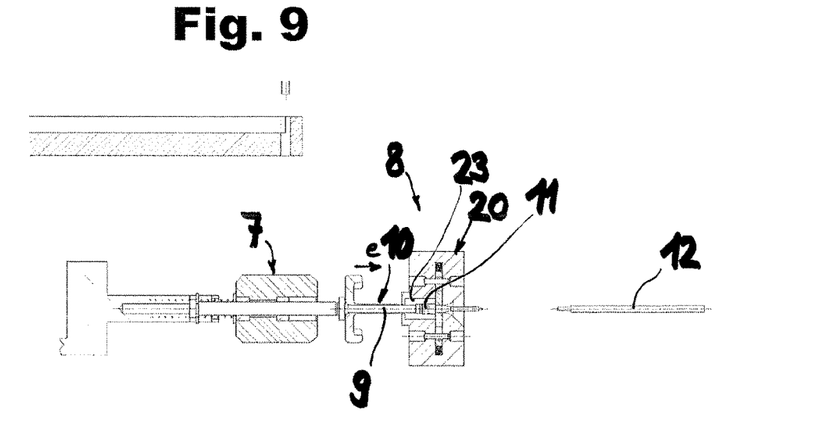
FIG. 9 shows the grommet assembly module with the closed assembly unit after extension of the mandrel.
Figure 10:
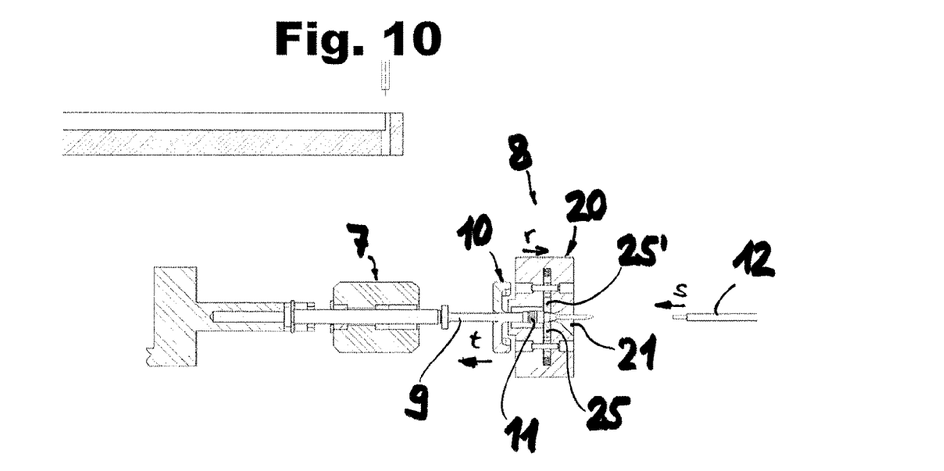
FIG. 10 shows the grommet assembly module with the closed assembly unit after retraction of an expansion sleeve in a grommet-receiving device of the assembly unit.
Figure 11:
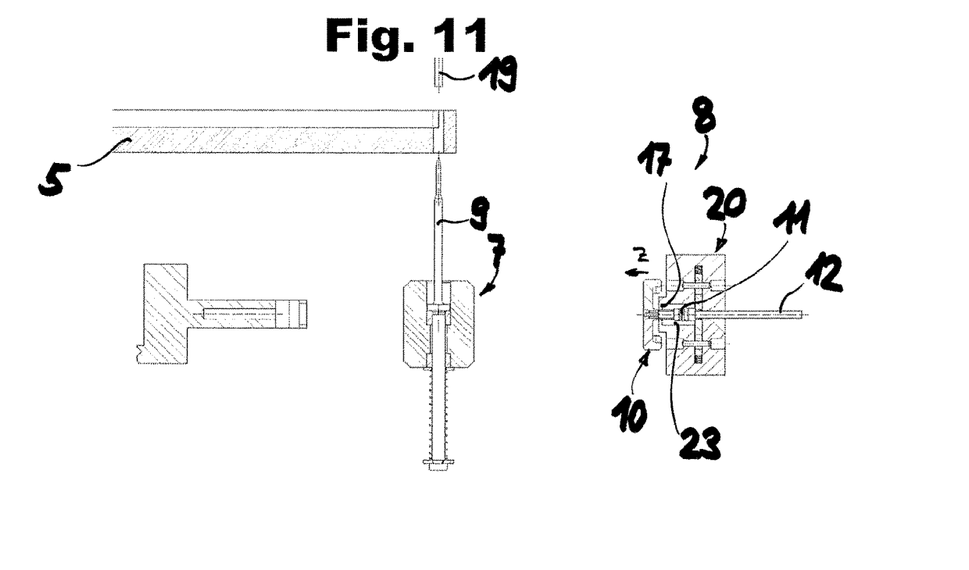
FIG. 11 shows the grommet assembly module after a further work step in which the assembly unit has been moved away from the transfer unit and after the cable has been inserted into the assembly unit.
Figure 12:
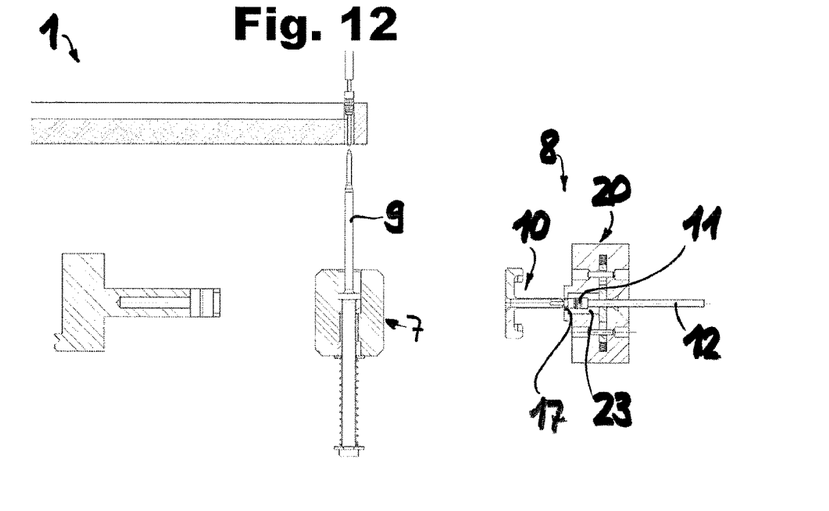
FIG. 12 shows the grommet assembly module with the assembly unit after the expansion sleeve has been removed from the grommet-receiving device.
Figure 13:
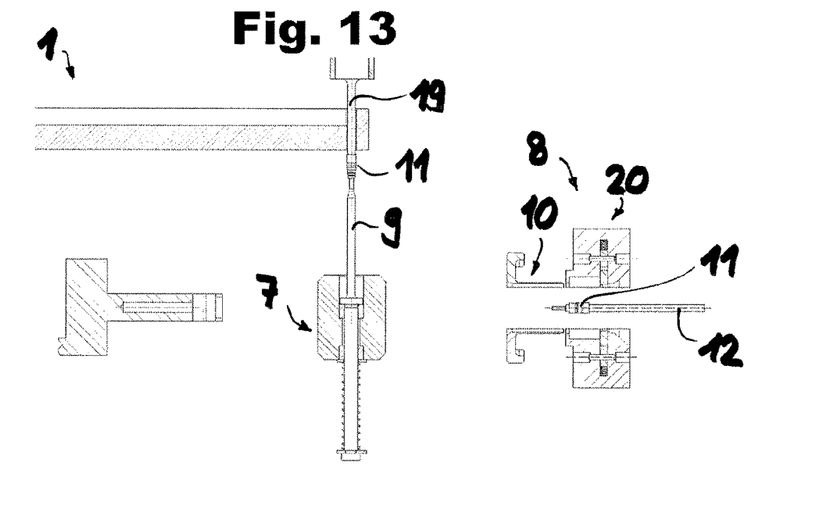
FIG. 13 shows the grommet assembly module after completion of the assembly process.

The method of providing the cable 12 with a grommet 11 is the following: If the mandrel 9 is in the vertical acquisition position, a grommet 11 can be pushed onto the mandrel 9 of the ejection device 19 by means of the plunger. After having been pushed, the grommet 11 is located on the front area of the mandrel 9 shown in FIG. 5. Subsequently, the transfer unit 7 with the mandrel 9 is pivoted by 90° to the position shown in FIG. 6. Now the mandrel 9 is in the delivery position. The docking element 33 at the end of the bolt 35 adjoining the mandrel 9 engages with the complementary receiver 34 of the pusher 32. Then the assembly unit 8 moves back into the open position in the direction of the arrow q, whereupon the open assembly unit 8 is positioned over the mandrel 9 with the grommet 11 pushed thereon. As is apparent from FIG. 7, the open expansion sleeves of the assembly unit 8 are located in a position behind the grommet 11. The grommet-receiving device 20 comprising the receiving channel 22 with the extended grommet-receiving section 23 is also in the correct axial position. Now the assembly unit 8 can be closed. The closing directions of the respective components 13, 13', 16, 16' of the assembly unit 8 are identified with the arrows s. The assembly unit 8 is then in the closed position shown in FIG. 8. The closed expansion sleeve 10 encompasses the mandrel 9. The grommet 11 is positioned in the grommet-receiving section 23 of the grommet-receiving device 20; the closed grommet-receiving device 20 encompasses the grommet 11 pushed onto the mandrel 9. In a next step, the pusher 32 is moved forward along the longitudinal central axis 30, whereby the mandrel 9 is moved from the rest position to the extended position in the direction of the arrow f. When the mandrel 9 moves toward the cable 12, the mandrel enters the grommet-receiving device 20 whereby the grommet 11 is pushed toward the rearward area of the mandrel 9 with the larger diameter. The pushing elements 25, 25', which form a stop for the grommet 11, create a pushing effect so that, during the insertion process, the grommet 11 comes in contact with the pushing elements 25, 25' and is stopped by these from further motion in the direction of the arrow f. Thanks to the resilient mounting of the pushing elements 25, 25', they follow the contour of the mandrel 9. FIG. 9 shows the assembly unit 8 with the mandrel 9 in the extended position. Then the expansion sleeve 10 is inserted into the grommet-receiving device 20 in the direction of the arrow e. In this case, the expansion sleeve 10 moves from the previous starting position into an end position, which is shown in FIG. 10. The expansion sleeve 10 moves in the axial direction along the mandrel 9 and expands the grommet 11 further. In this context, the grommet 11 is grasped by the expansion sleeve 10 from the rear. The grommet 11 is now located on the expansion sleeve 10. The pushing elements 25, 25' serve here as stops for the grommet and hold them back in the axial direction so that the grommet 11 is pushed onto the expansion sleeve. Then, via the funnel-shaped insertion section 21, the cable end of the cable 12 is inserted into the assembly unit 8 and the cable end is inserted into the expansion sleeve 10. The insertion of the cable end into the assembly unit 8 and into the expansion sleeve 10 takes place here by moving the assembly unit 8 in the direction r of the cable 12 and a short distance in the opposite direction (arrow s) through a motion of the cable 12. During the insertion of the cable end into the expansion sleeve 10, the mandrel 9 is simultaneously brought back into its original rest position by the backward pushing motion indicated by the arrow t. The motion t of the mandrel 9 could, however, also take place before the motions r, s of the assembly unit 8 and of the cable 12. Instead of moving both the assembly unit 8 and the cable 12, other motions would be conceivable as well. What is required are only relative motions in the axial direction of the assembly unit 8 with respect to the cable 12 for inserting the cable end into the expansion sleeve 10. The cable 12 could be stationary, for example, and only the assembly unit 8 moved. When the mandrel 9 is in the rest position, the transfer unit 7 can be pivoted back again. The mandrel 9 is now ready to receive a next grommet. This position with the mandrel 9 brought back into the acquisition position and with the assembly unit 8 with the cable end inserted therein is shown in FIG. 11. Now the expansion sleeve 10 can be moved back in the z direction into the starting position, whereby the grommet 11 is pushed onto the cable 12. When retracting the expansion sleeve 10, the grommet 11 is supported on the collar 17 so that the grommet 11 remains in the grommet-receiving section 23 of the grommet-receiving device 20 while the expansion sleeve 10 is extracted from the grommet-receiving device 20. In the position shown in FIG. 12, the finished cable 12 is shown with the grommet 11. Then the assembly unit 8 is brought into the open position (FIG. 13), and the cable end of the cable 12 provided with the grommet 11 can be fed by means of the gripper to a further cable processing station (not shown), such as a crimping station. The next grommet to be provided to a subsequent cable is already pushed onto the mandrel 9 in the position shown in FIG. 13.

Figure 14:
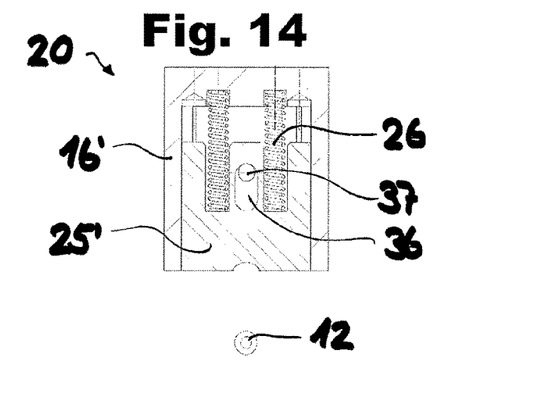
FIG. 14 shows a cross section through the grommet-receiving device of the assembly unit in a partial view.

FIG. 14 shows a cross section through a grommet-receiving device 20 of the assembly unit 8 wherein only the upper jaws 16' of the grommet-receiving device 20 are shown. The sectional plane extends vertically to the longitudinal central axis 30. A plate-like pushing element 25' is provided in the jaw 16', which is displaceable and resiliently positioned in the jaw 16' perpendicular to the longitudinal center axis 30. Two springs 26 are used for such a resilient positioning in the present example, which ensure that the pushing elements 25, 25' radially protrude inward and follow the contour of the mandrel 9 when it is inserted into the grommet-receiving device 20. The limited displaceability is provided by a slot 36 in the pushing element 25' which engages with a pin 37.

The present grommet station 1 pertains to an embodiment in which the transfer unit 7 is associated with exactly one mandrel 9. It would also be conceivable to provide a transfer unit with four mandrels. In this case, the person skilled in the art would have to modify the previously described grommet assembly module 3 in such a way that it omits the pusher and the axially displaceable mandrel. The assembly unit would have to be able to approach another position to push the grommet onto the larger mandrel diameter.

Furthermore, a model with a grommet-receiving device without integrated pushing means would be conceivable. Similar to the known grommet stations of the type in EP 0 626 738 A1, the pusher means could be arranged outside the grommet-receiving device and be associated with a further, third angular position of the mandrel.

The assembly unit 8 of the present grommet station 1 is mainly designed to assemble the cable. It would be conceivable as well to design the assembly unit as a whole in a fixed manner and to have the motions necessary of the cable be performed by the cable gripper or another cable conveyor device.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A grommet station including a grommet assembly module for providing a cable end of a cable with a grommet during an assembly operation, the grommet assembly module comprising:
   an assembly unit with an expansion sleeve for holding the grommet in an expanded state of the grommet and for placing the grommet onto the cable end;
   a transfer unit having a mandrel onto which the grommet can be pushed in an acquisition position of the transfer unit and the transfer unit being in operative connection with the assembly unit in a delivery position of the transfer unit such that the mandrel provides the assembly unit with the grommet;
   wherein the expansion sleeve of the assembly unit temporarily encompasses the mandrel in the delivery position;
   wherein the mandrel and the expansion sleeve are oriented on a longitudinal central axis in the delivery position;
   wherein the assembly unit includes a grommet-receiving device for receiving and holding the grommet during the assembly operation; and
   wherein the expansion sleeve is formed in two parts with two radially counter-movable shell parts, the grommet-receiving device is formed in two parts with two jaws, each of the jaws is movable together with one of the shell parts between a closed position and an open position.

2. The grommet station according to claim 1 wherein the expansion sleeve and the grommet-receiving device are mechanically coupled to each other, and wherein the expansion sleeve can be inserted into the grommet-receiving device.

3. The grommet station according to claim 1 wherein the assembly unit is a modular unit with the grommet-receiving device facing the cable and the expansion sleeve located downstream from the grommet-receiving device.

4. The grommet station according to claim 1 wherein the grommet-receiving device has a funnel-shaped insertion portion through which the cable end can be inserted into the grommet-receiving device.

5. The grommet station according to claim 1 wherein the grommet-receiving device has a receiving channel for receiving the mandrel with the grommet and the cable end, the receiving channel has a grommet-receiving section a collar is formed at a rear end of the grommet-receiving section, the collar forming a stop for the grommet to strip the grommet from the mandrel when the expansion sleeve is reversed out of the grommet-receiving device.

6. The grommet station according to claim 1 including pushing means integrated in the grommet-receiving device for further pushing the grommet on the mandrel from an area with a smaller diameter onto an area with a larger diameter for widening the grommet.

7. The grommet station according to claim 6 wherein the pushing means are movable perpendicular to the longitudinal central axis and include resiliently mounted pushing elements for pushing on the grommet.

8. The grommet station according to claim 1 wherein the transfer unit has a mandrel carrier in which the mandrel is movably positioned in axial direction between a rest position and an extended position and the mandrel can be moved from the rest position into the extended position by an actuator.

9. The grommet station according to claim 8 wherein the mandrel is held in the rest position by a spring generating a preloading force.

10. The grommet station according to claim 8 including a pusher that can be operated by an actuator to move the mandrel into the extended position.

11. The grommet station according to claim 1 wherein the transfer unit is associated with only one of the mandrel.

12. The grommet station according to claim 1 wherein the transfer unit is a pivot unit pivoting between the acquisition position and the delivery position.

13. The grommet station according to claim 12 wherein the transfer unit pivots in a pivoting range of 90° between the acquisition position and the delivery position.

* * * * *